Feb. 28, 1967  A. GOLDSTEIN  3,305,938
HAND-DRYING APPARATUS
Filed Dec. 9, 1964  7 Sheets-Sheet 1

INVENTOR
ARTHUR GOLDSTEIN
BY
Lieberman and Levy
ATTORNEYS

Feb. 28, 1967         A. GOLDSTEIN         3,305,938
HAND-DRYING APPARATUS
Filed Dec. 9, 1964         7 Sheets-Sheet 2

INVENTOR
ARTHUR GOLDSTEIN
BY
*Lieberman and Levy*
ATTORNEY

Feb. 28, 1967  A. GOLDSTEIN  3,305,938
HAND-DRYING APPARATUS
Filed Dec. 9, 1964  7 Sheets-Sheet 3

INVENTOR
ARTHUR GOLDSTEIN
BY
Lieberman and Levy
ATTORNEY

Feb. 28, 1967  A. GOLDSTEIN  3,305,938
HAND-DRYING APPARATUS

Filed Dec. 9, 1964  7 Sheets-Sheet 6

INVENTOR
ARTHUR GOLDSTEIN
BY
Lieberman and Levy
ATTORNEY

Feb. 28, 1967  A. GOLDSTEIN  3,305,938
HAND-DRYING APPARATUS
Filed Dec. 9, 1964  7 Sheets-Sheet 7

FIG. 14.

INVENTOR
ARTHUR GOLDSTEIN
BY
Lieberman and Levy
ATTORNEY

United States Patent Office 3,305,938
Patented Feb. 28, 1967

3,305,938
HAND-DRYING APPARATUS
Arthur Goldstein, 375 Milton Road, Cambridge, England
Filed Dec. 9, 1964, Ser. No. 417,085
Claims priority, application Great Britain, May 13, 1964, 19,935/64; Oct. 5, 1964, 40,559/64; Nov. 9, 1964, 45,549/64
11 Claims. (Cl. 34—44)

This invention relates to hand-drying apparatus of the kind in which warm air is blown on to wet hands to be dried.

An object of the invention is to provide an improved such apparatus by which wet hands can be dried more quickly than is possible with known apparatus.

A further object of the present invention is to provide a method of drying wet hands in which the hands are dried by the combined action of a paper towel suspended and positioned by two or more streams of warm air directed towards opposite sides of the paper towel.

According to the invention there is provided a hand drying apparatus comprising a cabinet in which towelling can be stored, said cabinet having an opening through which a length of towelling can hang; a blower operable to produce a stream of air; a duct through which said stream of air can pass, said duct having a discharge opening arranged so that the stream of air will pass therethrough and flow adjacent said hanging length of towelling; electrical heating means arranged within said duct so as to heat said stream of air before it discharges from said opening in said duct; and a control device operable to set said blower and said heating means in operation for a predetermined time interval.

With this invention an air stream will flow adjacent the paper towel hanging from the cabinet. The action of the warm air stream not only serves to dry the hands, but also tends to keep the sheet of paper towel dry and make it cling to the hands, thus saving an appreciable amount of paper and speeding the drying process.

There is, therefore, a great improvement in the art of drying by hot air as in the process greatly accelerated by the paper towelling.

To explain the physical phenomena involved in drying, it is well known that a wet object i.e. a wet hand, behaves as far as drying is concerned as a pool of water without containing the solid i.e. the hand, and therefore, it is subject to what is known in physics as "the constant rate of drying" which cannot be speeded up easily. By interposing into the air stream a dry and absorbent material like a paper towel, a substantial portion of the water is mopped up in the first few seconds, and the remaining film of water is easily evaporated in the warm air stream.

In the embodiment of the invention illustrated in FIGURES 1 to 4 inclusive, a hand-drying apparatus comprises a casing 1, which can be secured to a wall 2 or other fixed surface. Inside the casing 1 are support plates 3 having opposed slots 4 (only one of which is visible in the drawings) arranged removably to receive a shaft 5 of a supply reel 6 for a length of paper towel T. The towel is of wet-strengthened paper having transverse rows of perforations at suitably spaced intervals to enable suitable lengths easily to be torn off. The support plates 3 also have opposed slots 7 (only one of which is visible in the drawings) arranged removably to receive a guide roller 8.

Figure 1:
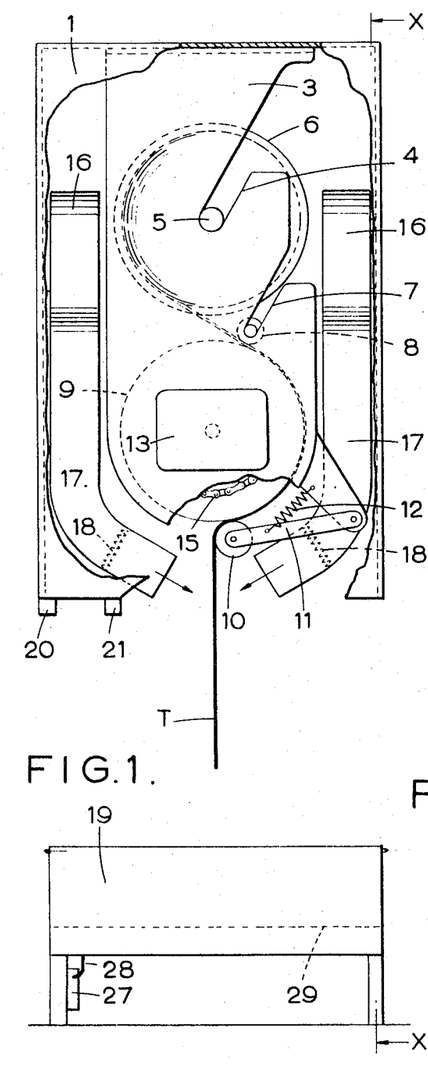
FIGURE 1 is a front view of a hand drying apparatus according to the invention, part of a casing of the apparatus being broken away.
Figure 2:
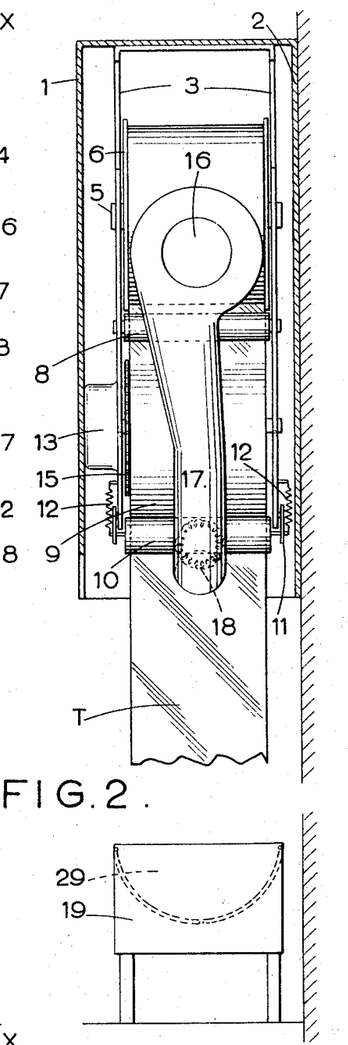
FIGURE 2 is a section on the line x—x of FIGURE 1.
Figure 3:
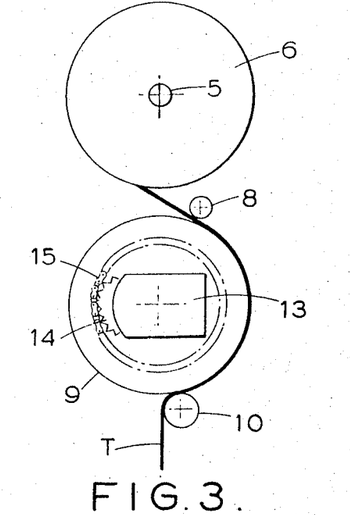
FIGURE 3 is a front view of part of the same apparatus.
Figure 4:
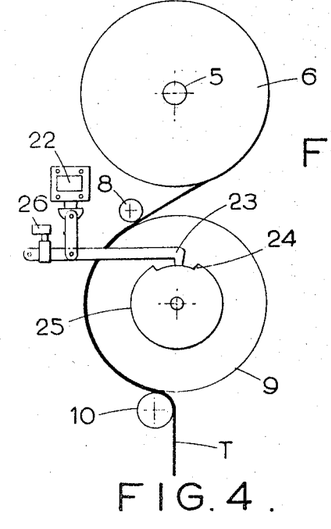
FIGURE 4 is a rear view corresponding to FIGURE 3.

A feed or measuring drum 9 is mounted between the support plates 3 beneath the supply reel 6. The paper towel T is passed from the supply reel 6, between the guide roller 8 and the drum 9, round approximately one half the surface of the drum 9, between the drum 9 and a tear-off roller 10 and then hangs vertically in a position of use as shown in the drawings. The drum 9 has a high-friction surface so that rotation of the drum will draw the towel from the supply reel 6. The roller 10 is mounted on arms 11 pivotally mounted on the side plate 3. Springs 12 act to hold the roller 10 on the surface of drum 9.

Inside the feed drum 9, is an electric feed drum motor 13 which can act through a sprocket 14 and a chain 15 to rotate the drum to advance a length of towelling to the position of use.

The casing 1 also contains two electrically driven blowers 16 leading into ducts 17 containing electrical heaters 18. These blowers 16 can therefore direct streams of warm air on to opposite sides of the length of paper towel hanging beneath the feed drum 9. If the wet hands of a person using the device are held in these streams of warm air issuing from the ducts 17, they can be dried partly by use of the hanging portion of the towelling T and partly by the warm air. When the hands have been dried, the hanging (or used) portion of the towel can be torn off and dropped into a soil bin 19 beneath the casing 1.

The operation of the device is controlled by a control device in the form of a photo-electric cell 20 arranged on the front of the casing 1. Alternatively, the control device can be a press-button switch or a pedal. A beam of light from a light source 21 is directed on to the photoelectric cell 20 and can be interrupted by the wet hands of the user of the apparatus. The interruption of the beam of light will cause the cell 20 to act through an electric circuit to set the blowers 16 and the heaters 18 in operation. At the same time it will energise an electric solenoid 22 (FIGURE 4) to lift a lever 23 from engagement in a depression 24 in a cam 25 rotatable with the feed drum 9. When the lever 23 is lifted by the solenoid 22, a micro-switch 26 is operated to set the electric motor 13 in operation to rotate the feed drum 9. After a short time interval (conveniently two seconds), the solenoid 22 is automatically deenergised, but the lever 23 cannot then return to its original position because rotation of the cam 25 has moved the depression out of register with the lever. Rotation of the feed drum will, of course, draw off a portion of paper towel from the supply reel 6 and position a portion of equal length beneath the drum. When the drum and the cam have completed a full revolution, the lever 23 is free to drop into the depression 24 thereby to operate the micro-switch 26 to stop the motor 13 and further rotation of the drum. When the lever is engaged in the depression 24, the drum is positively locked against rotation so that it is impossible to pull off a further length of paper towel until the drum is again rotated.

A timing circuit (not illustrated) is operable to switch off the blowers 16 a predetermined time (conveniently thirty-five seconds) after the feed drum has ceased to rotate. This time interval is sufficient to enable the hands to be dried. The timing circuit also operates at the same time to energise another electric solenoid 27 (FIGURE 1) which acts on a linkage 28 to open a lid 29 of the bin 19 so that the portion of towelling on which the hands have been dried can be thrown into the bin.

Figure 5:
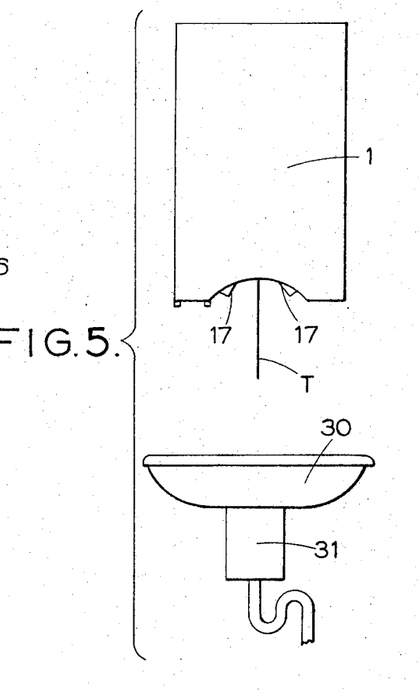
FIGURE 5 is a schematic view of a modification.

In the modification illustrated in FIGURE 5, the casing 1 is arranged over a wash basin 30 having its waste pipe leading into a waste disposal unit 31 connected to a sewage system in conventional manner. The solenoid 27 then operates to set the disposal unit in operation.

Figures 6, 7:
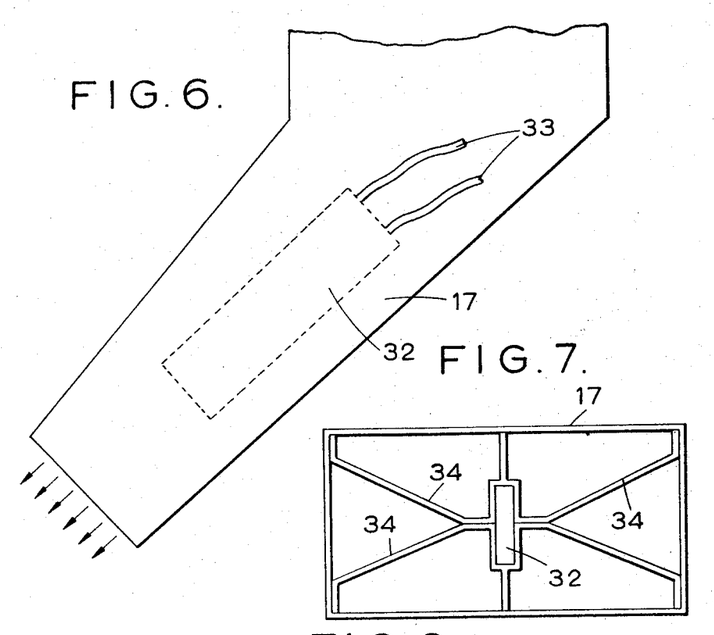
FIGURES 6 and 7 are details illustrating a preheating device that can be incorporated in the drying apparatus.

FIGURES 6 and 7 illustrate a modification in which a small secondary electric heater 32 is arranged in each of the ducts 17. These heaters 32 are connected by leads 33 to a mains supply. These are pre-heaters which remain in operation permanently while the apparatus is in use and ensure that the air discharged from the ducts is warm to the hands even in the first two or three seconds after the blowers 16 and main heaters 18 have been set in operation by the cell 20. A further advantage of these pre-heaters 32 is that they enable the total loading of the main heaters to be reduced. Metal vanes or webs 34 are connected with the heaters 32 to assist in heat transfer.

Figure 8:
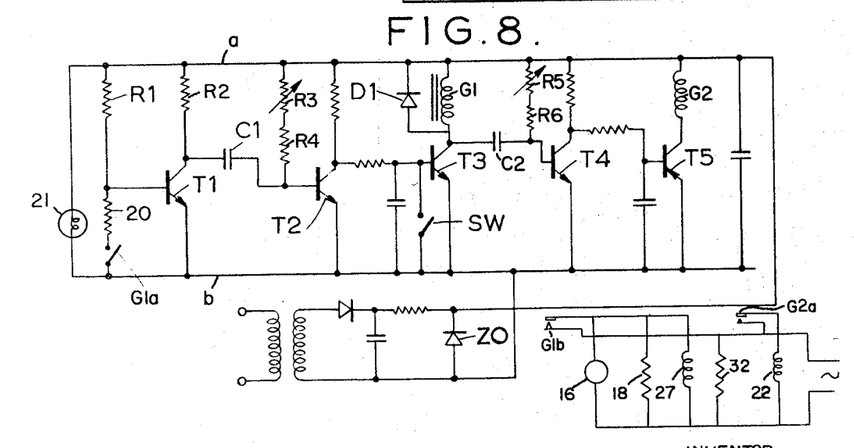
FIGURE 8 is a circuit diagram.

An electrical network for controlling the heater, blowers and other devices of the various embodiments is illustrated in FIGURE 8 and includes series coupled transistors T1, T2, T3, T4 and T5 respectively which are energized by a D.C. voltage source including a conventional transformer, rectifier network and a shunting regulator and protection diode ZO. The voltage supply includes opposite lines $a$ and $b$. The photocell 20 is a photoresistor connected through normally closed relay contacts G1$a$ between the base of transistor T1 and line $b$, the relay contacts G1$a$ being actuated by relay coil G1 connected in the collector circuit of transistor T3. The base of transistor T1 is connected through a resistor R1 to line $a$ and the photocell 20 is exposed to lamp 21 which is connected between lines $a$ and $b$.

The collector of transistor T1 is connected through resistor R2 to line $a$ and through timing capacitor C1 to the base of transistor T2 which base is connected through series connected variable resistor R3 and resistor R4 to line $a$ the resistors R3, R4 and capacitor C1 defining an RC timing circuit. The collector of transistor T2 is connected through resistor R5 to line $a$ and through a resistor to the base of transistor T3 which in turn is connected through a capacitor and a switch SW to line $b$. The collector of transistor T3 is connected through the relay coil G1 to line $a$ which coil is shunted by a protector diode D1, and to the base of transistor T4 through a capacitor C2.

The base of transistor T4 is connected through series connected variable resistor R5 and resistor R6 to line $b$ which resistors define with capacitor C2 a second RC timing network. The collector of transistor T4 is connected by a resistor to line $a$ and by a resistor to the base of transistor T5. The collector of transistor T5 is connected through a relay coil G2 to line $a$.

The blower 16, main heater 18 and solenoid 27 are connected in parallel across a power line through normally open relay contacts G1$b$ actuated by relay coil G1. The solenoid 22 is connected across the power line through normally open relay contacts G2$a$ which are actuated by relay coil G2 and the heater 32 is connected directly across the power line.

In the dormant state of the network the contacts G1$a$ are closed and the photocell 20 exposed to the lamp 21 is of such low resistance as to apply a cut-off bias to transistor T1 rendering T2 conductive, T3 cut-off, T4 conductive and T5 cut-off. When the photocell 20 is shielded from lamp 21, as aforesaid, its resistance sharply increases, increasing the signal to the transistor base rendering transistor T1 conductive, T2 at cut-off, T3 conductive, T4 at cut-off and T5 conductive. The conducting transistors T3 and T5 energize relay coils G1 and G2, to close contacts G1$b$ and G2$a$ and open contacts G1$a$. The closing of contacts G1$b$ and G2$a$ energizes the blower 16, heater 18 and solenoids 27 and 22 and the opening of contacts G1$a$ maintains transistor T1 conducting independent of the exposure of photocell 20.

After a time interval determined by the time constant of C1 (R3+R4), the signal on the base of transistor T2 is raised to render the transistor T2 conductive and hence transistor T3 cut-off to open contact G1$b$ and de-energize blower 16, heater 18 and solenoid 27 and close contact G1$a$ to return the transistor T1 to light control. Similarly, after a time interval determined by the time constant C2 (R5+R6) the base of transistor T4 is raised to render transistor T4 conductive and hence transistor T5 cut-off to open contact G2$a$ and de-energize the solenoid 22. The closing of switch SW renders transistor T3 non-conductive to place the network in its quiescent condition.

Figure 9:
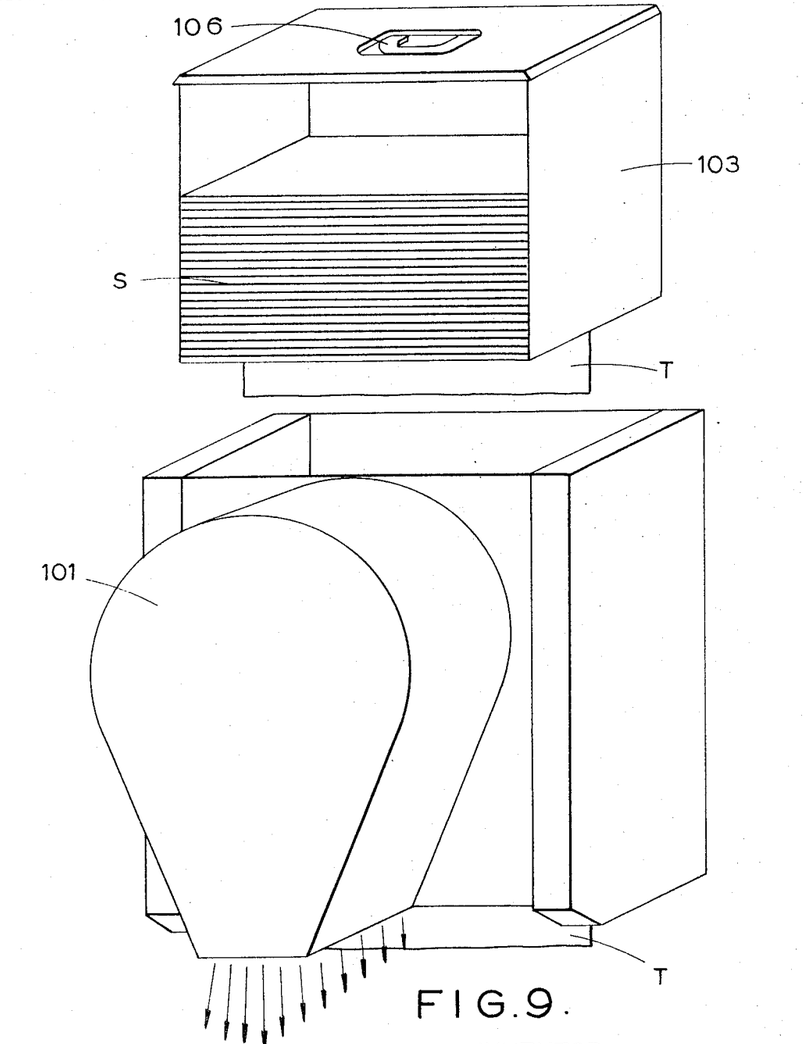
FIGURE 9 is an exploded perspective view of another embodiment of the invention.
Figure 10:
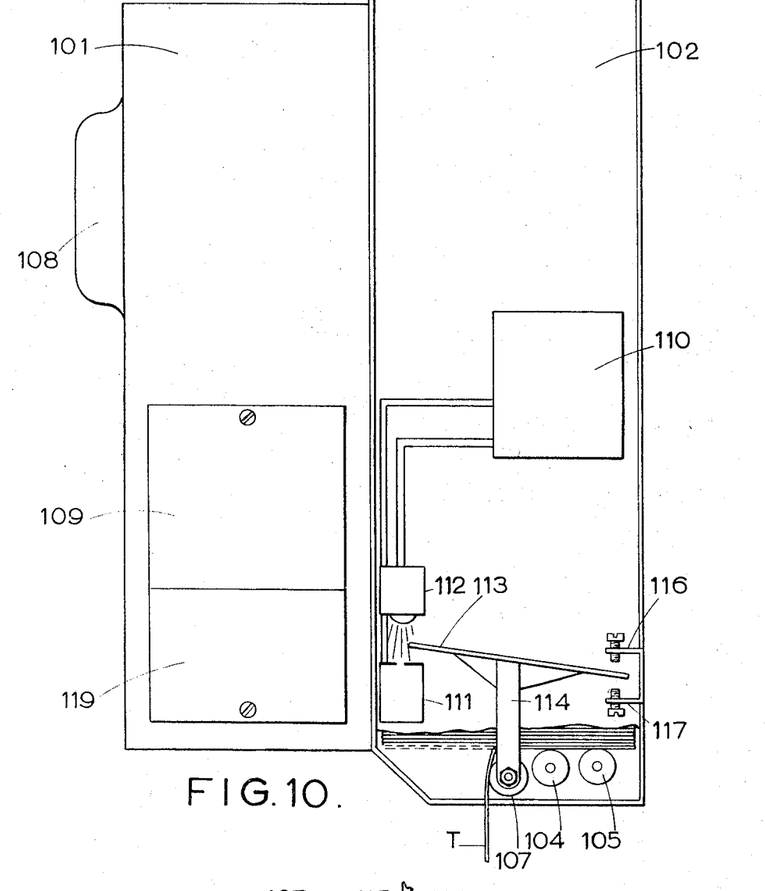
FIGURE 10 is an elevation of the same embodiment, partly in section.
Figure 11:
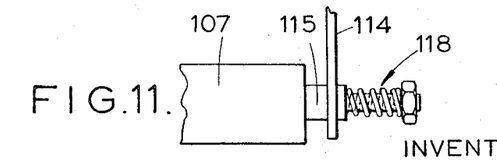
FIGURE 11 is a scrap view illustrating a detail of the same device.

In the embodiment illustrated in FIGURES 9, 10 and 11 the device comprises a cabinet or casing provided with a front compartment 101 and a back compartment 102. The cabinet is preferably made of sheet metal and can be secured to a wall or similar fixed surface. The back compartment 102 is open at the top and bottom and is arranged to receive a towel holder 103 as a sliding fit in the compartment.

The towel holder 103 has the front half of its bottom open and is arranged to receive a stack S of interleaved paper towels. Bottom edges of the holder 103 rest on two rollers 104, 105 which extend transversely across the bottom of the back compartment 102. These rollers 104, 105 are positioned to engage that portion of the bottom of the stack of towels which is exposed and not supported by the bottom of the holder.

A portion T of the bottom towel in the stack S will hang vertically downwards as shown in FIGURE 9. The towel holder 103 has an open front which permits the stack of towels S easily to be inserted in the holder and this open front is closed by a co-operating wall of the back compartment 102 when the holder is inserted in that compartment. The top of the holder 103 has a fold-in handle 106 by which it can be lifted from the back compartment 102 as required.

A front or operating roller 107 is also arranged at the bottom of the bank compartment 102 so that the downwardly hanging portion T of the bottom towel in the stack will pass over this roller as shown in FIGURE 10. When the towel holder 103 has been fully inserted in the back compartment 102 the hanging portion T of the bottom towel will be beneath the cabinet. This towel can therefore be withdrawn by pulling the hanging portion and the withdrawal of the bottom towel will cause the front roller 107 to rotate.

The front compartment 101 of the cabinet is provided with an electrically operated blower-fan 108 which forces air out through an opening at the bottom of the front compartment.

A main electric heater 109 is also arranged in the front compartment to heat air before it issues from the open bottom of the front compartment as indicated by the arrows in FIGURE 9.

This fan 108 and the electrical heater 109 are both set in operation for a desired time interval by means of a transistorised timing device 110 which may be of any known type, for example, as illustrated in FIGURE 8, and is controlled by a photoelectric cell 111. A source 112 of illumination directs a beam of light on to the cell 111. The cell 111 and the light source 112 are both arranged inside the back compartment 102 near the bottom thereof. When the beam of light is not interrupted, the timing device 110 is not in operation. An obturating blade 113 is provided to interrupt the beam of light whenever a towel is withdrawn from the bottom of the stack. This blade 113 is supported on a rocker arm 114 connected to a spindle 115 supporting the front roller 107. Whenever a towel is withdrawn from the bottom of the stack, the front roller 107 is rotated because the towel passes over that roller and rotation of the roller will tilt the rocker arm 114 so as to position the obturating blade 113 to interrupt the light beam, thereby to set the timing device 110 in operation. Adjustable stops 116, 117 are fitted to the back of the back compartment 102 so as to limit the movement of the blade 113. The rocker arm 114 is connected with the spindle 115 through a spring-loaded slipping clutch 118 so that even when the blade is moved its fullest extent the roller can still continue to rotate to permit the towel to be withdrawn. The blade 113 is set at such an angle that when the rotation of the front roller 107 is terminated the blade can return to its initial position (in which it cannot interrupt the light beam) under the action of gravity.

A secondary electric heater 119 is arranged near the bottom of the front compartment 101. This heater is of low power and is provided to pre-heat the air in the compartment 101. The heater 119 is controlled by a separate manually controlled switch and can be kept switched on all the time the device is in use. This arrangement will ensure that warm air will discharge from the compartment 101 immediately the blades for 108 is set in operation. Warm air will be discharged as soon as the main heater 109 has warmed up.

Figures 12, 13:
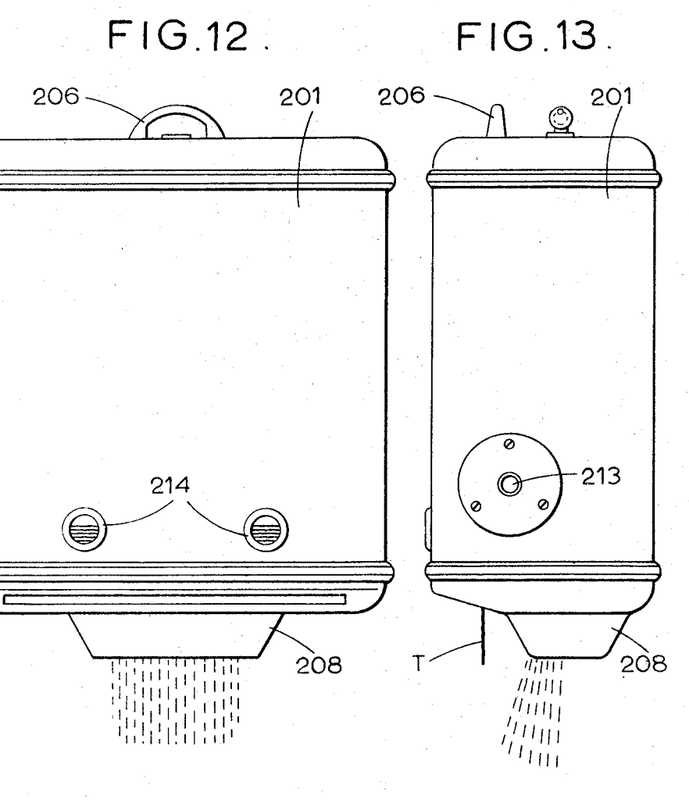
FIGURE 12 is a front view of yet another embodiment of the invention.
FIGURE 13 is an elevation of the embodiment of FIGURE 12.
Figure 14:
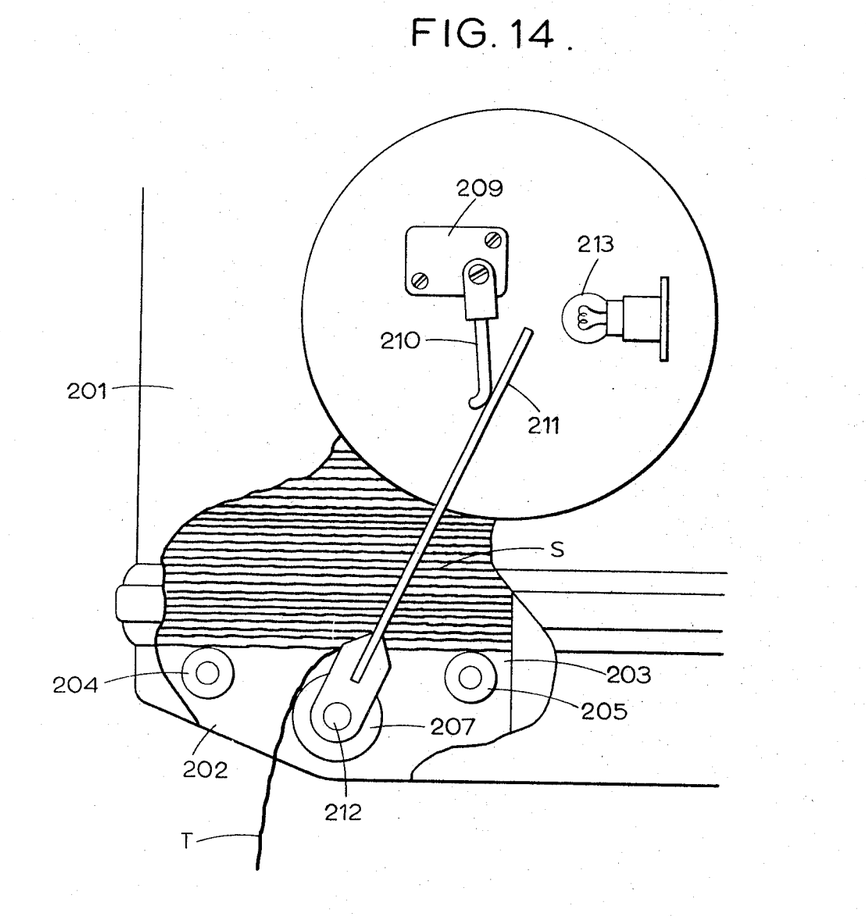
FIGURE 14 is a scrap view illustrating a detail of the embodiment of FIGURE 12.

The embodiment of the invention illustrated in FIGURES 12, 13 and 14 comprises a cabinet or casing 201 preferably made of sheet metal and arranged to be secured to a wall or similar fixed surface. The cabinet has a front compartment 202 which is open at the top and bottom and is arranged to receive a towel holder 203 as a sliding fit in the compartment.

The towel holder 203 has a partly open bottom and is arranged to receive a stack S of interleaved paper towels. The bottom towel in the stack S rests on two rollers 204, 205 which extend transversely across the bottom of the front compartment 202.

When the towel holder 203 has been fully inserted in the compartment 202, a portion T of the bottom towel in the stack S will hang vertically downwards as shown in FIGURES 13 and 14. The towel holder 203 has an open front which permits the stack of towels S easily to be inserted in the holder and this open front is closed by a co-operating wall of the compartment 202 when the holder is inserted in that compartment. The top of the holder 203 has a handle 206 by which it can be lifted from the compartment 202 as required.

An operating roller 207 is also arranged at the bottom of the compartment 202 so that the downwardly hanging portion T of the bottom towel in the stack will pass over this roller as shown in FIGURE 14. This towel can be withdrawn by pulling the hanging portion T and the withdrawal of the bottom towel will cause the roller 207 to rotate.

A back compartment of the cabinet is provided with an electrically operated blower-fan (not shown) which forces air out through a discharge funnel 208 at the bottom of the back compartment.

A main electric heater is also arranged in the back compartment to heat air before it issues from the funnel 208.

This fan and the electrical heater are as in the embodiment of FIGURES 9, 10 and 11 both set in operation for a desired time interval by means of a transistorised timing device. In the embodiment, the timing device is set in operation by a micro-switch 209, a switch arm 210 of which can be moved to operate the microswitch 209 by movent of a rocker arm 211 connected by a slipping clutch 212 to a spindle supporting the roller 207. Whenever a towel is withdrawn from the bottom of the stack, the roller 207 is rotated and such rotation of the roller 207, will swing the rocker arm 211 so as to close the switch 209 and set the timing device in operation.

An indicator lamp 213 can be arranged behind a window 214 in the cabinet to provide an indication that the device is ready for use. Further windows 214 can be arranged at the front of the cabinet so that it will be possible easily to observe when the towel holder needs re-filling. A secondary electric heater can be arranged near the bottom of the back compartment, this heater being of low power and arranged to pre-heat the air in the back compartment.

What I claim is:

1. A hand drying apparatus comprising a cabinet in which towelling can be stored, said cabinet having an opening through which a length of towelling can hang; a blower operable to produce a stream of air; a duct through which said stream of air can pass, said duct having a discharge opening arranged so that the stream of air will pass therethrough and flow adjacent said hanging length of towelling; electrical heating means arranged within said duct so as to heat said stream of air before it discharges from said opening in said duct; and a control device automatically operable by withdrawal of said length of towelling from said cabinet to set said blower and said heating means in operation for a predetermined time interval.

2. A hand drying apparatus comprising a control device, a feed drum for advancing a length of paper towel to a position of use at which it hangs beneath said drum, means arranged to be set in operation by said control device to rotate said feed drum for a predetermined period of time sufficient to advance a desired length of towel to said position of use, means arranged to be set in operation by said control device to direct streams of warm air for a longer predetermined time interval on to opposite sides of said length of towel at said position of use, and means automatically operable when the supply of warm air has ceased to receive a used length of towel detached from the towelling remaining on said drum.

3. An apparatus as claimed in claim 2 comprising in addition a bin arranged beneath said feed drum to receive lengths of paper towel detached from the towel remaining on said drum, a lid normally closing said bin, and an electric solenoid arranged to open said lid when the supply of warm air has ceased.

4. A hand drying apparatus comprising a control device, a feed drum for advancing a length of paper towel to a position of use at which it hangs beneath said drum, an electric motor operable in response to said control device to rotate said feed drum, a cam rotatable with said feed drum and provided with a depression, a pivoted lever engageable in said depression positively to hold said cam and said feed drum against rotation, an electric solenoid operable in response to said control device to disengage said lever from said depression, a switch operable by movement of said lever from said depression to set said electric motor in operation to rotate said drum and also operable by movement of said lever into said depression to stop rotation of said motor, a pair of blowers arranged on opposite ends of said drum, ducts leading from said blowers and arranged to direct air on to opposite sides of said length of paper towel at said position of use electric heater in said ducts, and means operable in response to said control device to set said blowers and said electric heaters in operation for a predetermined time interval whereby warm air is directed on to said length of towel.

5. An apparatus as claimed in claim 4 comprising in addition secondary electric heaters arranged in said ducts and normally in operation.

6. An apparatus for drying hands comprising a photo-electric control device, a feed drum for advancing a length of paper towel to a position of use at which it hangs beneath said drum, means for removably supporting a supply reel for paper towel above said feed drum, a removable guide roller arranged to bear on said feed drum so that said towel can pass between said roller and said drum, a tear-off roller, pivoted arms on which said tear-off roller is supported, spring means connected with said arms for urging said tear-off roller into engagement with the lower surface of said feed drum, an electric motor operable to rotate said drum, a cam rotatable with said feed drum and provided with a depression, a pivoted lever engageable in said depression to hold said cam and said feed drum positively against rotation, an electric solenoid operable in response to said control device to disengage said lever from said depression, a switch operable by movement of said lever from said depression to set said electric motor in operation to rotate said drum and also operable by movement of said lever into said depression to stop rotation of said motor, a pair of blowers arranged on opposite sides of said drum, ducts arranged to direct air from said blowers on to opposite sides of said towel at said position of use, electric heater in said ducts, and means operable by said control device to set said blowers in operation for a predetermined time.

7. A hand drying apparatus comprising a cabinet having an opening therein; a towel holder removably fitted in said cabinet and arranged to receive a stack of interleaved towels in such a manner that the bottom towel in said stack will have a portion hanging below said holder and passing through said opening; means for discharging warm air from said cabinet adjacent said hanging portion of towel; a timing device arranged to set said means for discharging warm air in operation for a predetermined time; and means operable by withdrawal of said bottom towel in said stack from said towel holder and said cabinet to actuate said timing device.

8. A hand drying apparatus comprising a cabinet having an opening therein; a towel holder removably fitted in said cabinet and arranged to receive a stack of interleaved towels in such a manner that the bottom towel in said stack will have a portion hanging below said holder and passing through said opening; means for discharging warm air from said cabinet adjacent said hanging portion of towel; a timing device arranged to set said means for discharging warm air in operation for a predetermined time; a roller over which a towel travels as it is withdrawn from said stack; a light source within said cabinet; a photo-electric cell arranged within said cabinet to receive a beam of light from said light source, said photo-electric cell being arranged to set said timing device in operation when said beam is interrupted; an obturating blade movable to interrupt said beam; and a rocker arm which carries said blade and is operatively connected with said roller so as to move said blade to interrupt said beam when a towel is withdrawn from said stack.

9. A hand drying apparatus comprising a cabinet having an opening therein; a towel holder removably fitted in said cabinet and arranged to receive a stack of interleaved towels in such a manner that the bottom towel in said stack will have a portion hanging below said holder and passing through said opening; means for discharging warm air from said cabinet adjacent said hanging portion of towel; a timing device arranged to set said means for discharging warm air in operation for a predetermined time; a roller over which a towel travels as it is withdrawn from said stack, said roller being rotated by such withdrawal; a switch operable to set said timing device in operation; and a rocker arm movable to operate said switch and operatively connected with said roller so as to operate said switch when a towel is withdrawn from said stack.

10. An apparatus as claimed in claim 9 further comprising a secondary heater arranged in said cabinet to pre-heat air in said cabinet.

11. A hand drying apparatus comprising a cabinet having an opening therein; a towel holder removably fitted in said cabinet and arranged to receive a stack of interleaved towels in such a manner that the bottom towel in said stack will have a portion hanging below said holder and passing through said opening; a blower for discharging a stream of air from said cabinet so as to flow adjacent said hanging portion of said towel; a main heater for heating said stream of air before it discharges from said cabinet; a timing device arranged to set said blower and said main heater in operation for a predetermined time; means operable by withdrawal of said hanging portion of said towel from said cabinet to actuate said timing device; and a secondary air heater arranged in said cabinet to pre-heat air in said cabinet when said main heater is not in operation.

References Cited by the Examiner

UNITED STATES PATENTS

| | | | |
|---|---|---|---|
| 1,016,270 | 2/1912 | Johnson | 312—39 |
| 2,521,769 | 9/1950 | Arcularius. | |
| 2,555,416 | 6/1951 | Marano | 34—53 X |
| 2,606,274 | 8/1952 | Spierer | 34—55 X |
| 2,698,894 | 1/1955 | Stein | 34—53 X |
| 2,853,591 | 9/1958 | Fine | 34—243 X |
| 3,192,008 | 6/1965 | Dwyer | 312—38 X |

FOREIGN PATENTS 939,952  3/1956  Germany.

FREDERICK L. MATTESON, JR., *Primary Examiner.*

A. D. HERRMANN, *Assistant Examiner.*